United States Patent

Ross et al.

[11] Patent Number: 5,297,332
[45] Date of Patent: Mar. 29, 1994

[54] OIL FILTER DISASSEMBLY AND RECYCLING APPARATUS

[76] Inventors: Gilbert B. Ross; Charles Brittain, both of 814 San Fernando Rd., Sun Valley, Calif. 91352

[21] Appl. No.: 997,728

[22] Filed: Dec. 30, 1992

Related U.S. Application Data

[63] Continuation-in-part of Ser. No. 851,011, Mar. 13, 1992, Pat. No. 5,182,842.

[51] Int. Cl.⁵ ............................................. B23P 19/04
[52] U.S. Cl. ...................................... 29/801; 29/240; 29/822; 30/434
[58] Field of Search ................. 29/403.3, 426.2, 426.3, 29/426.4, 801, 822, 240, DIG. 67, 33 P; 100/902; 30/417, 430, 434, 441; 82/92, 101; 198/468.2, 468.5

[56] References Cited

U.S. PATENT DOCUMENTS

| | | | |
|---|---|---|---|
| 539,971 | 5/1895 | Anderson | 30/434 |
| 3,608,192 | 9/1971 | Hansel | 30/441 |
| 3,900,948 | 8/1975 | Kammeraad | 30/441 |
| 4,418,594 | 12/1983 | Burns, Jr. | 100/902 |
| 5,011,001 | 4/1991 | Cameron | 198/468.2 |

Primary Examiner—P. W. Echols
Assistant Examiner—David P. Bryant
Attorney, Agent, or Firm—Louis J. Bachand

[57] ABSTRACT

A cycling oil filter disassembly and recycle apparatus (10) comprising separate operating heads (56, 76, 106) provided for transport of filters (12) and filter components (14, 16, 18) to and from a disassembly facility where the filters (12) are cut, and for transport of disassembled components (14, 16, 18) to recycle receptacles (32, 34, 36) arranged to receive the components transported.

11 Claims, 4 Drawing Sheets

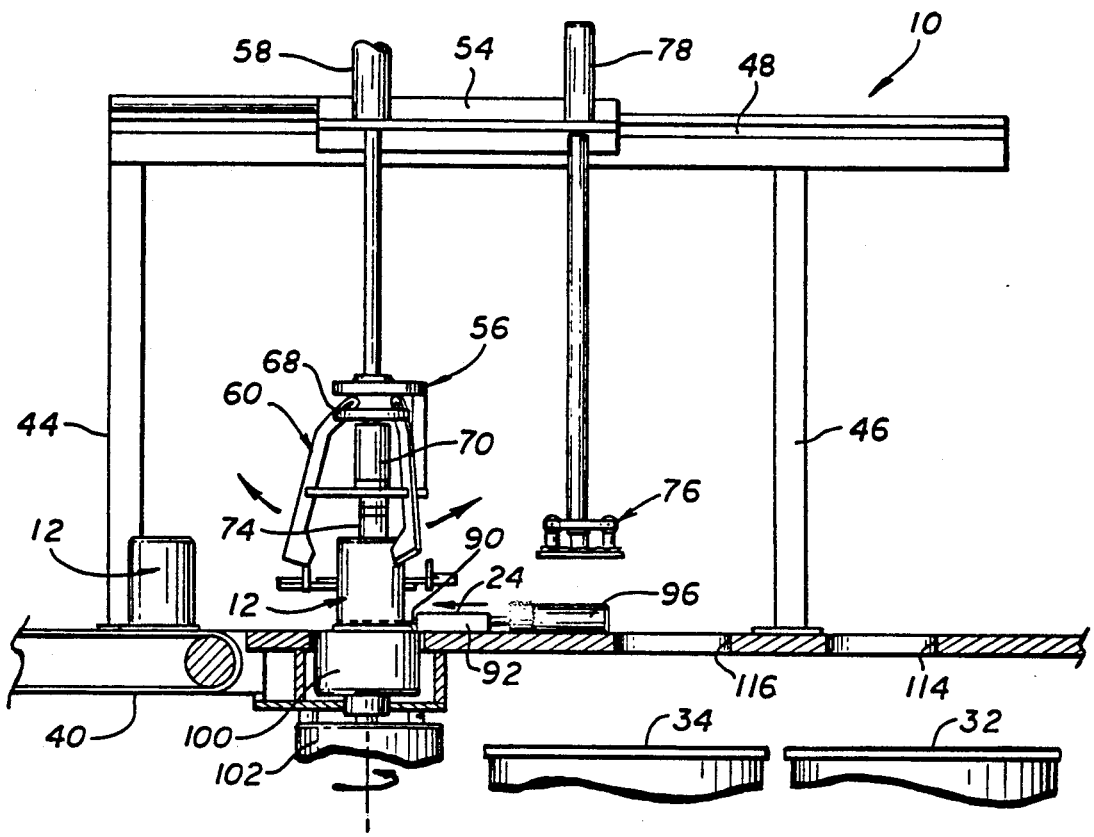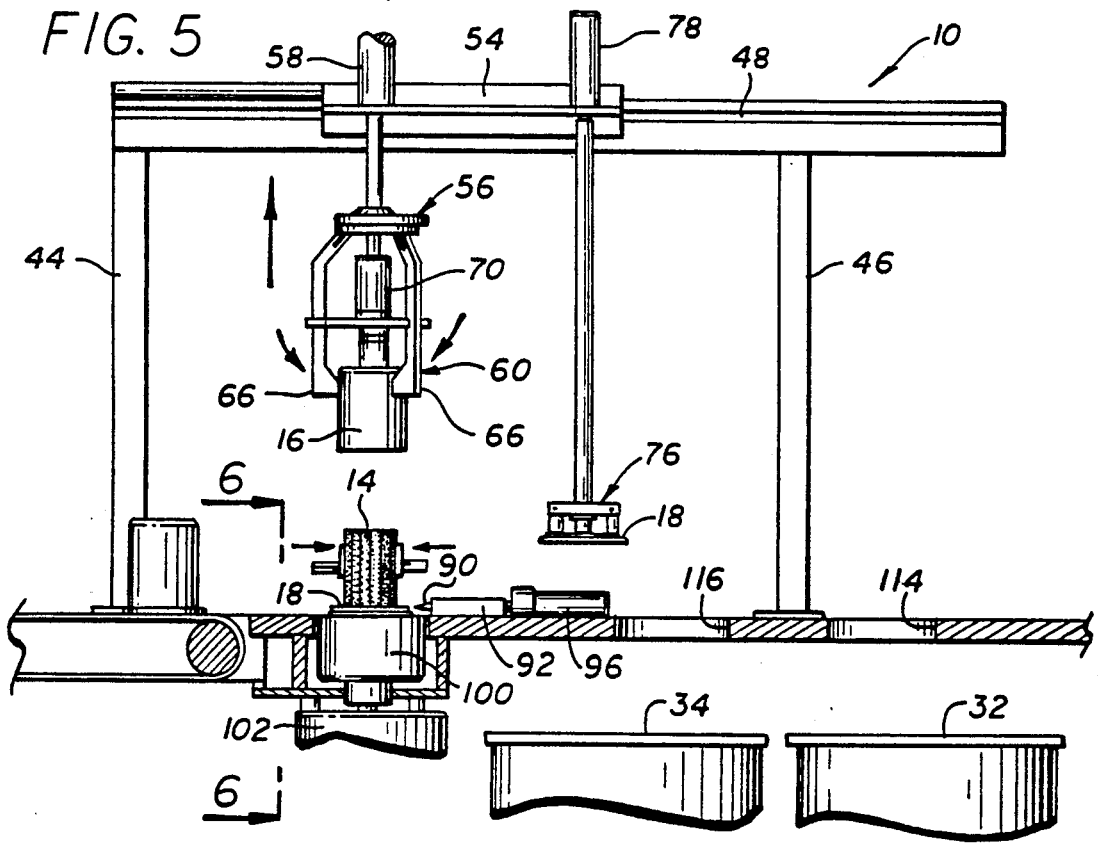

OIL FILTER DISASSEMBLY AND RECYCLING APPARATUS

REFERENCE TO RELATED APPLICATION

This application is a continuation-in-part of our copending application, Ser. No. 07/851,011, filed Mar. 13, 1992, now U.S. Pat. No. 5,182,842, the disclosure of which is incorporated herein by this reference.

TECHNICAL FIELD

This invention relates to apparatus for recovering the useful components of oil filters used in automotive, truck, and other internal combustion engines. More particularly, the invention relates to a highly automated apparatus for the step-wise disassembly of oil filters into their component parts for recovery and recycle, as a key part of a program to gather, break-down and recycle the vast quantity of oil filters removed from service every day. The apparatus generates clean, pre-separated scrap components free of contamination with other components. That is, the filter elements are separate from the canisters and the heavier metal base is recovered free of the canister as well. Paper and oil do not contaminate the steel components.

BACKGROUND ART

Modern transportation and numerous stationary industrial engines require oil to function. The oil plays a vital role in lubricating surfaces, carrying away harmful particulate, and cooling the engine. Particulates carried in the oil are removed by cycling the oil through a filter. The typical oil filter for this purpose comprises a substantial metal base, of steel or the like, a lighter weight canister, and the filter element per se, usually a mass of fibrous material enclosed by the canister and arranged to trap particulates in the oil and separate them. The metal base is perforated to provide for oil passage into the canister. Periodic replacement of the oil is essential to engine life. At such replacement the filter is usually replaced as well. This process generates tens of millions of used filters annually. Disposal of these filters is an environmental problem. First, their oil content must be well drained. Then the oil impregnated filter element must be captured for environmentally safe disposal, and the metal components, the canister and base, directed to appropriate recyclers of these types of metal.

The problem with recovery and recycle as just outlined is that as a practical matter the gathering and processing of millions of units requires an enormous amount of labor as the units are difficult to handle, hard to disassemble, and so numerous as to overwhelm ordinary scrap recyclers.

DESCRIPTION OF THE INVENTION

It is an object of the invention, accordingly, to provide apparatus in which the disassembly of oil filters and diversion of disassembled components to appropriate recycle groups is conducted in a mechanized, repetitive way which may be computer controlled and geared to vast quantities of units routinely being processed. These and other objects of the invention to become apparent hereinafter are realized in apparatus for disassembling and recycling the filter element, perforated base and canister components of engine oil filters, comprising spaced facilities for disassembling and recycling oil filter components, means to deliver oil filters to said disassembly facility, means at the disassembly facility to sever the canister from the base, a first operating head comprising means to transfer the canister from the disassembly facility to the recycling facility, a second operating head comprising means to transfer the base from the disassembly facility to the recycling facility; and means to clear the disassembly facility of the filter element after the transfer of the canister and base and before further delivery of oil filters to be disassembled.

In a particularly preferred embodiment, there is provided apparatus for the disassembly and recycling of oil filters comprising a perforated metal base fixed to a canister and a filter element within the canister, the apparatus comprising a cutting means comprising a cutting blade adapted to engage the filter canister adjacent the base, means to shift the element from the cutting means; a loading locus at a fixed spacing before said cutting means; and a series of recycling receptacles beyond the cutting means; a shuttle movable along a predetermined path between the loading locus, the cutting means and the recycling receptacles, the shuttle carrying a canister shifting means and a base shifting means; an element shifting means adjacent the cutting means; the canister shifting means and the base shifting means being in fixed spaced relation on the shuttle corresponding to the fixed spaced relation of the loading locus to the cutting means and the cutting means to the recycling receptacles enabling successive pairs of registrations of the canister and base shifting means with the loading locus and the cutting means and with the receptacles, whereby translational movement of the shuttle along the predetermined path registers the canister shifting means with the loading locus for pickup of a filter assembly while the base shifting means registers with the cutting means for pickup of a severed base, and further translational movement of the shuttle along the predetermined path registers the canister shifting means with the cutting means for depositing the canister, for severing of the base from the canister and removing the severed canister from the cutting means, and the base shifting means with the apparatus beyond the severing means, and still further translational movement of the shuttle along the predetermined path registers the canister shifting means with a severed canister beyond the cutting means for deposit of the severed canister and the base in respective recycling receptacles to clear the shifting means for return to the loading locus and the cutting means for a further cycle.

BRIEF DESCRIPTION OF THE DRAWINGS

The invention will be further described in conjunction with the attached drawings in which:

FIG. 4 is a view like FIG. 1, showing the oil filter at the severing station;

FIG. 5 is a view like FIG. 1, showing the canister being removed, exposing the oil filter element;

BEST MODE FOR CARRYING OUT THE INVENTION

Figure 1:
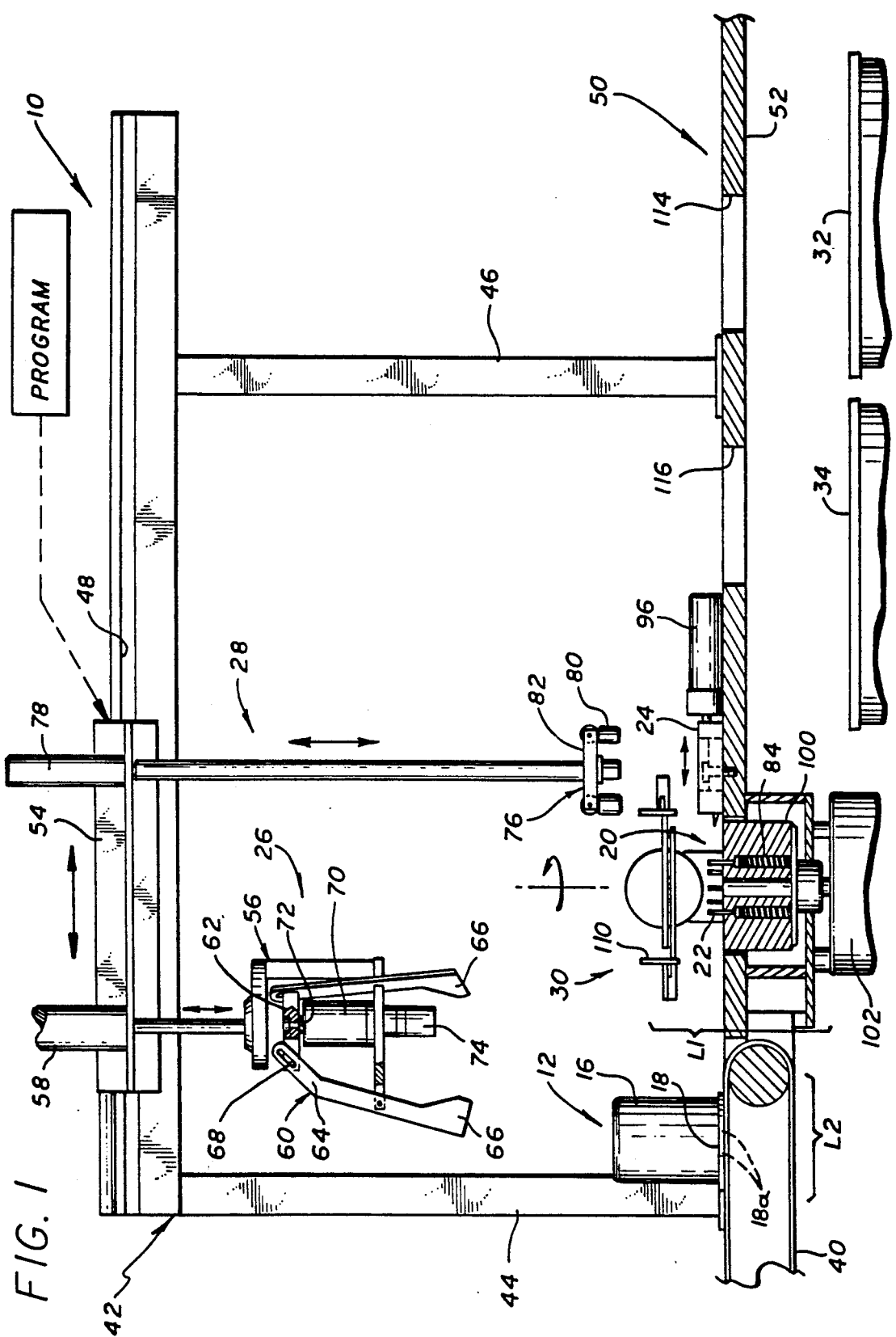
FIG. 1 is a side elevation of the apparatus, partly broken away to show underlying parts.

In overview, and with reference to the drawings in detail, FIGS. 1-7, the invention disassembly and recycling apparatus for oil filters is shown at 10. The oil filter 12 comprises a vertically extended filter element 14 (FIG. 5), a downwardly open canister 16 enclosing the filter element, and a perforated metal base 18 fixed across the canister opening in filter element securing relation. The apparatus has a disassembly facility at severing locus L1 at which filter retaining means 20 and cutting means 24 are provided. Filter retaining means 20 comprise pins 22 extending through the metal base 18 perforations 18a, cutting means 24 are disposed radially of the pins 22 and arranged as shown to cut the pin-retained base free 18 from the canister 16. Separate means 26, 28 and 30 are provided for shifting the base 18, canister 16 and filter element 14 from the severing locus L1 to receptacles 32, 34 and 36 (FIGS. 5 & 6), respectively, for recycling.

The disassembly and recycling operation commences at loading locus L2. There, oil filters 12, gathered from service stations, fleet operators and other sources are delivered in upright orientation by means not shown on conveyor belt 40. As earlier referenced, the oil filter 12 comprises a perforate base 18, a canister 16 generally crimped to the base, and within a filter element 14. The conveyor belt 40 is arranged to bring the oil filters 12 to the loading locus L2. The apparatus 10 includes a frame 42 one end of which is adjacent the end of conveyor belt 40. The frame 42 includes uprights 44, 46 which support a track 48 above a bed 50 defined by a plate 52. Shuttle 54, a substantial metal member, rides on track 48, driven by suitable means, such a air or liquid, or is driven electrically. The track 48 and shuttle 54 are arranged such that the shuttle may oscillate between the severing locus L1 and the loading locus L2, and as will be seen beyond the severing locus for removal of oil filter components to recycling facility comprising recycle receptacles 32, 34.

Figure 2:
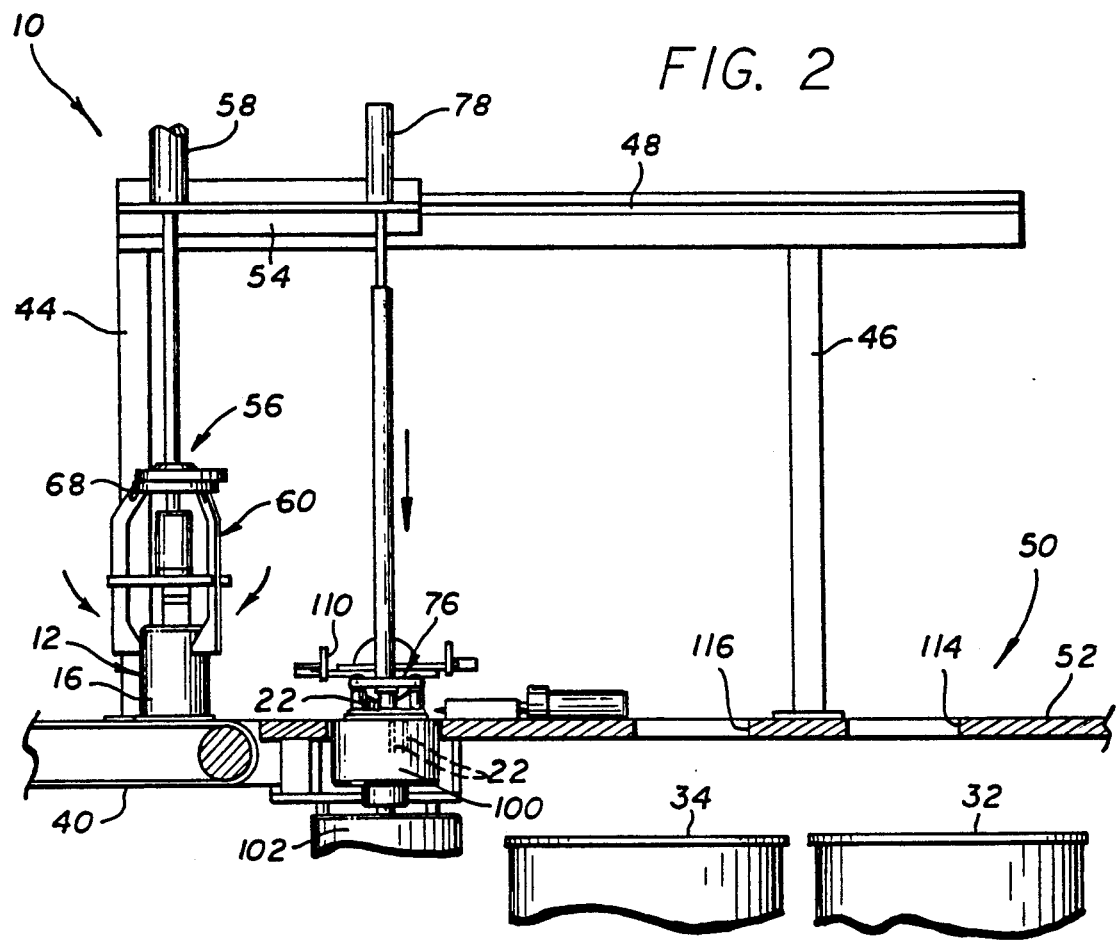
FIG. 2 is a view like FIG. 1 showing the apparatus at the commencement of a new cycle.

The shuttle 54 carries a first operating head 56 comprising a vertical motion cylinder and piston assembly 58, and a clamp 60 comprising a block 62 on which the slotted upper ends 64 of the clamp arms 66 are loosely captured by pins 68 extending from the block. The lower ends of clamp arms 66 are coupled to clamp cylinder 70 which extends or retracts relative to block 62 under the pressure of clamp piston 72 against the block and shifts the clamp arms 66 outward or inward respectively. Cf. FIGS. 1 and 2. Operating head 56 further comprises an magnet 74 centered in the clamp 60, for engaging the canister 16 during cutting operations, as will be described. For this purpose, the magnet 74 is mounted to clamp cylinder 70 in a manner to rotate on its own axis.

Shuttle 54 carries a second operating head 76 also for vertical motion. A cylinder and piston combination 78 serves to raise or lower the second operating head 76 relative to the bed 52. Operating head 76 comprises a grouping of small magnets 80 carried by plate 82 for gimbal motion to better adapt to varying surfaces on the filter metal bases 18, as will be further described.

The first and second operating heads 56, 76 are fixed in a predetermined longitudinally spaced relation defined by the shuttle 54. This spacing enables different functions of the apparatus to be accomplished by complementary spacing being used along the bed 52, as will now be described.

With particular reference to FIG. 2, at loading locus L2 the upright oil filter 12 from conveyor 40 is gripped by the clamp 60. The magnet 74 is generally not activated at this point, the clamp 60 being used to move the oil filter 12. It will be noted that second operating head 76 has moved with the first operating head 56, together in fixed relation on the shuttle 54. While the first operating head 56 is lowered by piston 58, the second operating head is lowered by piston 78. The second operating head magnets 80 are engaged with a base 18 from a previously processed filter 12, as earlier described. The value of the fixed spacing of the operating heads is thus shown. By moving the shuttle 54 to a location, the heads 56, 76 can perform simultaneously their separate functions.

Figure 3:
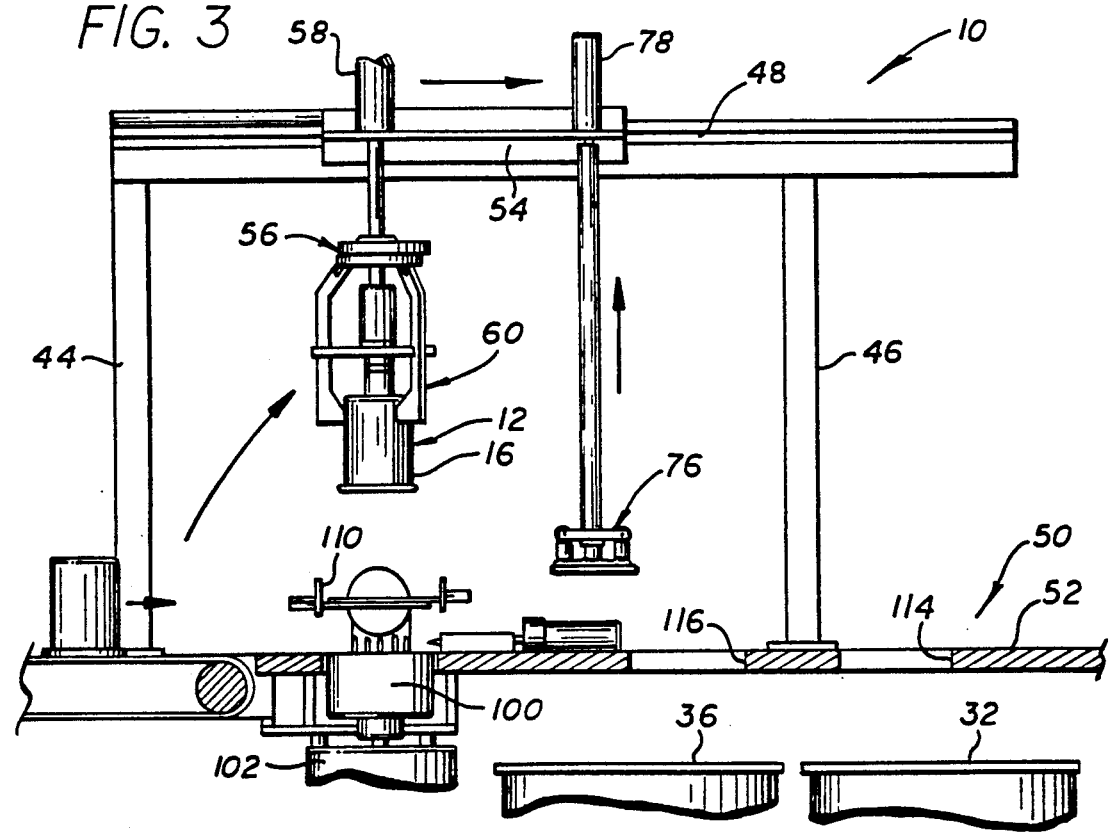
FIG. 3 is a view like FIG. 1, showing the oil filter being brought to the severing locus.

In FIG. 3, the first operating head 56 is lifted by piston 58, and second operating head 76 is lifted up by piston 78. The shuttle 54 is simultaneously drawn rearwardly along track 48, as shown. It will be noted that the previous filter base 18 is engaged with the second operating head magnets 80, and the new filter 12 is engaged by the clamp 60. Also shown is a further filter 12 being brought to locus L1 by the conveyor 40.

In addition, removal of the base 18 reveals an array of pins 22. These pins 22, as above noted, are spring loaded by coil springs 84 and resilient when deflected vertically. Pins 22 are arrayed circularly in keeping with the general configuration of filter bases 18. As is known, filter bases 18 are perforated in different patterns and spacings depending on filter purpose, size and brand. In order to accommodate as wide a variety of filters 12 as possible, a universal pin system is desirable, and thus numerous pins 22 in a universal pattern are provided. Pins 22 which do not register with a perforation opening in a base 18 would interfere with operation of the apparatus by precluding full seating of the oil filter on the pins 22, so all pins are spring mounted so as to deflect downward if there is no registration of a particular pin with a base perforation. See FIG. 2.

In FIG. 4, the first operating head 56 has brought the oil filter 12 down onto the pins 22 at severing locus L1. At this point the magnet 74 is energized providing support for the canister 16 portion of the oil filter 12. The clamp 60 is released from the oil filter 12. The cutting means 24 comprising cutting blade 90 held in support 92 is moved into engagement with the canister 16 of the oil filter 12 by operation of piston and cylinder 96.

The pins 22 are carried in a rotatable head 100 driven by a motor 102. Upon two or more of the pins 22 entering the base 18 perforations 18a, and energization of the magnet 74, the rotatable head 100 is rotated rapidly through several revolutions as necessary to sever the wall of canister 16 at a point just above the base 18. In this manner, cutting of the more rugged base 18 is avoided in favor of the thin walled canister.

While this operation is conducted, the former filter base 18 is suspended above the bed 52 as shown from the second operating head 76 which has been moved vertically, and rearwardly, translationally, with the shuttle 54 as the first operating head 56 was moved into position above and opposite the severing locus L1. The second operating head magnets 80 support the base 18 in this position.

With reference to FIG. 5, the first operating head 56 has clamped the canister 16 now freed from the base 18 and lifted it vertically off the filter element 14. The second operating head 76 remains in place.

Figure 6:
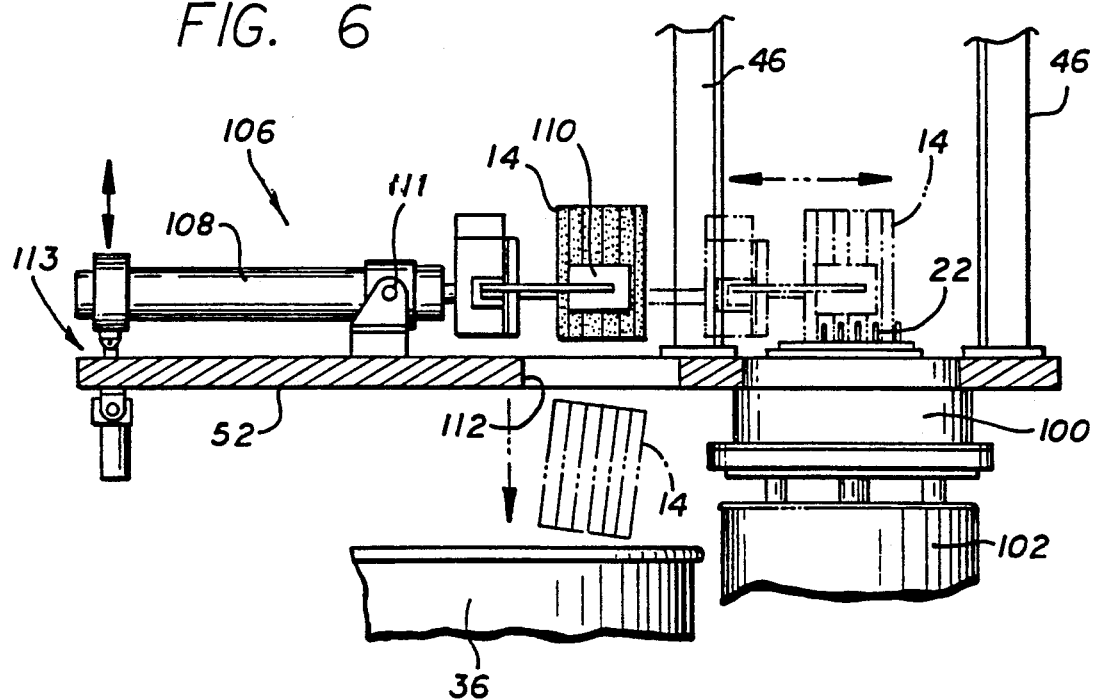
FIG. 6 is a side elevation view, showing the filter element being shifted to recycle; and, FIG. 7 is a view like FIG. 1, showing the base and the canister being shifted to recycle.

With reference to FIG. 6, the filter element 14 is shifted from is the severing locus L1 by third operating head 106. Operating head 106 comprises a cylinder and piston 108 mounted horizontally on bed 52 as shown. Jaws 110 are moved forward by the cylinder and piston 108 from a position of rest after the canister 16 has been lifted from the filter element 14, See FIG. 5. Jaws 110 are closed about the filter element 14, and the gripped filter element withdrawn and shifted by the cylinder and piston out of the severing locus L1 and into registration with a recycling receptacle 36 beneath aperture 112 in the bed 52. The jaws 110 are vertically shiftable to enable the filter element 14 to clear the upthrust pins 22 by provision of a pivot for the cylinder and piston at 111, and a cam-operated arm 113 to rock the piston and cylinder in a movement lifting the filter element off the pins 22. The filter element 14 is thus separated, segregated and collected for processing to remove residual oil and shredding into environmentally useful form.

The jaws 110 are then returned to their rest position for the next cycle.

Figure 7:
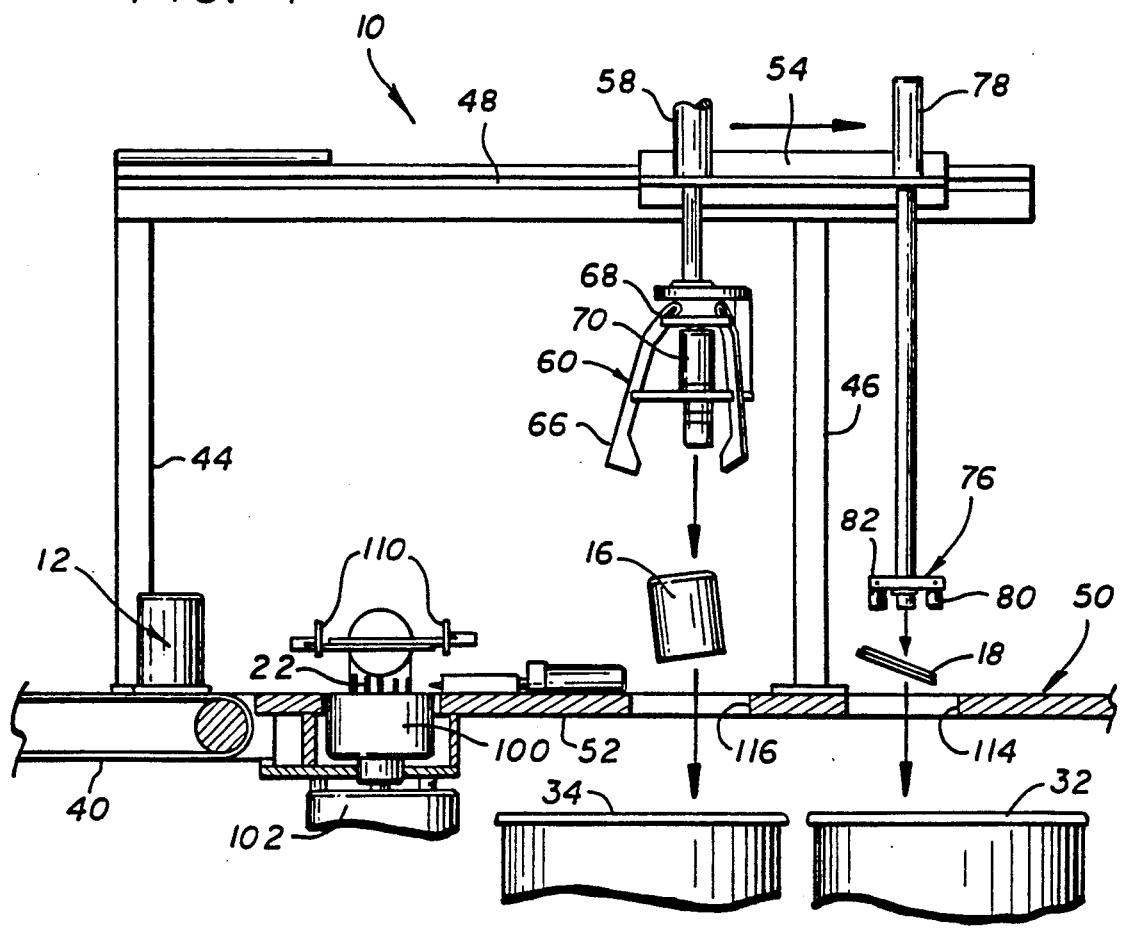

With reference to FIG. 7, the shuttle 54 is further moved translationally from the severing locus L1, now carrying the clamped canister 16 and the previous filter base 18, to shift these filter components into registry with their respective separation, segregation and collection receptacles 32, 34, as shown beneath apertures 114, 116 in the bed 52. At this point, the next filter 12 has been moved into position at the loading locus L2, as shown.

The sequencing of the described operations are readily controlled by a suitably programmed computer, as indicated in FIG. 1.

The invention thus provides an apparatus in which the disassembly of oil filters and diversion of disassembled components to appropriate recycle groups is conducted in a mechanized, repetitive way which is computer controlled and geared to vast quantities of units routinely being processed. The apparatus separates the oil filter components in an integrated fashion with disposal thereof, and shifts oil filters and oil filter components from station to station without human labor input, progressively disassembling the units into components, and directing the components into separate locations for recycle without need of further separating steps. The apparatus utilizes the perforate base of the typical oil filter to drive the filter for cutting operations severing the base from the canister above the base, and carried the units and unit components on a common shuttle between stations for successive operations after impaling the oil filters on a universal array of separately deflectable pins which extend through the perforate base in the pattern dictated by the pattern of perforations. The filter element is shifted from pin engagement by rocking the element upward off the pins. Magnets are used to shift the ferrous metal bases from their position of the pins, and clamping means carried by the shuttle ar used to shift the unit and the canister portion of the unit.

We claim:

1. Apparatus for disassembling and recycling the filter element, perforated base and canister components of an oil filter, comprising spaced facilities for disassembling and recycling said oil filter components, means to deliver an oil filter comprising said components to said disassembly facility, means at said disassembly facility to sever said canister from said base, means to transfer said canister from said disassembly facility to a first recycling facility, means to transfer said base from said disassembly facility to a second recycling facility; and means to clear said filter element from said disassembly facility before another delivery of oil filter to be disassembled.

2. Disassembly and recycling apparatus according to claim 1, in which said disassembly facility comprises cutting means including a blade for severing said canister from said base and means for retaining said base at said disassembly facility during severing of said base from said canister.

3. Disassembly and recycling apparatus according to claim 2, including means for driving said oil filter arcuately with said base retained by said retaining means and with said canister in cutting engagement with said blade to sever said base from said canister.

4. Disassembly and recycling apparatus according to claim 1, in which said base, said canister transferring means is shiftable, with said canister engaged thereby, from said disassembly facility to said first recycling facility.

5. Apparatus according to claim 4, in which said canister thereto transferring means comprises clamping means for clamping said canister.

6. Disassembly and recycling apparatus according to claim 1, in which said base transferring means is shiftable, with said base engaged thereby from said disassembly facility to said second recycling facility.

7. Disassembly and recycling apparatus according to claim 6, in which said base is magnetic and said base transferring means includes a magnet for magnetically engaging said base.

8. Disassembly and recycling apparatus according to claim 6, in which said canister transferring means engages said canister and said base transferring means engages said base for transfer of said canister and base separately to said first and second recycling facilities.

9. Disassembly and recycling apparatus according to claim 1, in which said filter element clearing means clears said filter element from said disassembly facility after transfer of said canister and before transfer of said base by said canister and base transfer means respectively.

10. Disassembly and recycling apparatus according to claim 1, in which said canister transfer means separates said canister from said filter element, and said filter element clearing means comprises means to shift said filter element from said disassembly facility.

11. Apparatus for the disassembly and recycling of oil filters comprising a perforated metal base fixed to a canister and a filter element within the canister, said apparatus comprising a cutting means comprising a cutting blade adapted to sever said canister adjacent said base; means to shift said filter element from said cutting means; a loading locus spaced from said cutting means; a canister recycling receptacle beyond said cutting means; and a shuttle movable along a predetermined path between said loading locus, said cutting means and said canister recycling receptacle, said shuttle comprising a canister shifting means for successive registration of said canister with said loading locus, said cutting means, and said canister recycling receptacle, whereby a severed canister is shifted to said canister recycling receptacle in timed relation with shifting of a filter element and a metal base from said cutting means.

* * * * *